United States Patent [19]

Kimura et al.

[11] Patent Number: 4,747,474

[45] Date of Patent: May 31, 1988

[54] HYDRAULIC BUFFER

[75] Inventors: Takashi Kimura, Kanagawa; Osamu Matsumoto, Tokyo, both of Japan

[73] Assignee: Tokico Ltd., Kanagawa, Japan

[21] Appl. No.: 896,203

[22] Filed: Aug. 14, 1986

Related U.S. Application Data

[63] Continuation-in-part of Ser. No. 811,758, Dec. 20, 1985, abandoned.

[30] Foreign Application Priority Data

Dec. 20, 1984 [JP] Japan .................................. 59-193464
Aug. 15, 1985 [JP] Japan ........................... 60-125452[U]

[51] Int. Cl.⁴ ............................ F16F 9/46; B25G 3/28
[52] U.S. Cl. ..................................... 188/299; 188/319; 267/220; 403/282
[58] Field of Search ............. 188/299, 319; 267/20 A, 267/23, 8 R, 34, 35, 60, 63 R, 152, 153, 158, 160, 217, 218, 220, 241, 256; 280/707, 668, 6.1; 403/282, 338

[56] References Cited

U.S. PATENT DOCUMENTS

| | | | |
|---|---|---|---|
| 2,017,210 | 10/1935 | Kirsch | 403/282 X |
| 3,420,341 | 1/1969 | Keehn, II | 188/319 |
| 3,957,380 | 5/1976 | DeGrazia | 403/338 X |
| 4,298,193 | 11/1981 | Mourray | 267/63 R |
| 4,434,977 | 3/1984 | Chiba et al. | 267/33 |
| 4,474,363 | 10/1984 | Numazawa et al. | 267/8 R X |
| 4,478,396 | 10/1984 | Kawaura | 267/8 R |
| 4,596,320 | 6/1986 | Shimokura et al. | 188/299 |

FOREIGN PATENT DOCUMENTS 0040292 10/1965 Fed. Rep. of Germany ...... 188/319
0106241 6/1983 Japan ..................................... 267/34
0110212 7/1984 Japan .

Primary Examiner—Andres Kashnikow
Assistant Examiner—Robert J. Oberleitner
Attorney, Agent, or Firm—Wenderoth, Lind & Ponack

[57] ABSTRACT

A hydraulic buffer of the type in which a damping force can be controlled has a piston rod projecting from a cylinder, and a bracket attached to the projecting end of the piston rod. The bracket has at least two claws which are bent inwardly to face each other. A retainer is provided with at least two fitting portions having flukes and the fitting portions are adapted to engage with respective claws of the bracket. An actuator is attached to the retainer to control the damping force of the buffer. A spring device is provided for biasing the retainer to prevent the flukes from being disengaged from the corresponding claws of the bracket, and the spring device supports the retainer on the bracket.

7 Claims, 10 Drawing Sheets

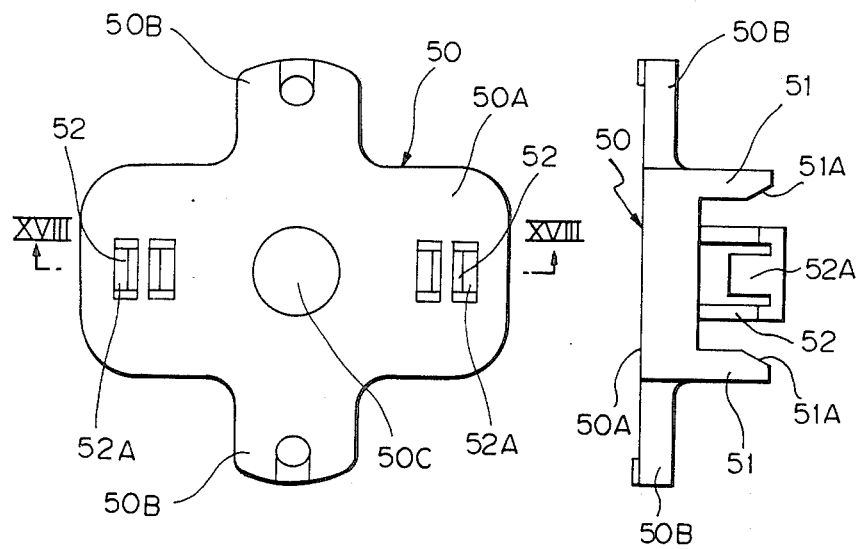
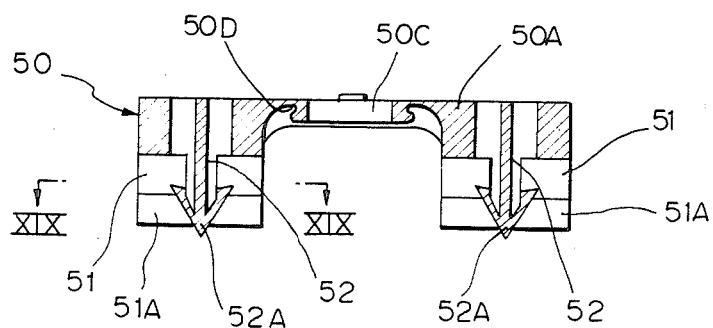

HYDRAULIC BUFFER

This is a continuation-in-part application of U.S. patent application Ser. No. 811,758 filed on Dec. 20, 1985, now abandoned.

BACKGROUND OF THE INVENTION

1. Field of the Invention

The present invention relates to a hydraulic buffer of the type in which the damping force can be controlled. More particularly, the present invention pertains to improvement of the hydraulic buffer of the type described above in which an actuator for controlling the damping force can readily be mounted on a bracket secured to the projecting end of the piston rod of the buffer in a single and simple operation.

2. Description of the Related Art

A typical conventional hydraulic buffer of the type in which the damping force can be controlled comprises: a piston rod one end of which projects from a cylinder; a cylindrical bracket with a closed end which is screwed onto the projecting end of the piston rod by means of a nut in such a manner that the bracket is secured to the upper surface of a cushion member; and an actuator for controlling the damping force which is secured to the open end side of the bracket by screws through a plate (see, e.g., the specification of Japanese Utility Model Laid-Open No. 110212/1984).

In the above-described prior art arrangement, as shown in FIG. 3, a projecting end 1A of a piston rod 1 is inserted into a hole 2A of a body 2, the projecting end 1A is passed through a cushion member 3 and a bracket 5 of an actuator 4 for controlling damping force, and a nut 6 is screwed onto the projecting end 1A such as to fix the piston rod 1 to the body 2 of a vehicle, the actuator 4 also being fixed by screws 7 to the bracket 5 which has been fixed in this manner.

However, since the bracket 5 in the prior art arrangement is formed in a cylindrical shape having a bottom and the nut 6 is screwed onto the projecting end 1A of the piston 1 which projects into the bracket 5 through a hole 5A in the bottom of the bracket 5, the screwing of the nut 6 is comparatively difficult because the screwing tool needs to be inserted into the bracket 5 downwardly and the nut 6 then needs to be rotated by the tool. Furthermore, when the hydraulic buffer body is exchanged, the screws 7 are removed, the actuator 4 for controlling damping force is removed, and then the screwing tool is inserted into the bracket 5 for removal of the nut 6. The mounting and removal of the actuator 4 and the nut 6 are thus disadvantageously tiresome, involving lowered operational efficiency.

SUMMARY OF THE INVENTION

In view of the above-described circumstances, it is a primary object of the present invention to provide a hydraulic buffer of the above-mentioned type in which the nut for fixing the projecting end of the piston rod to the body of a vehicle can be screwed with a tool which is sidewardly inserted into the bracket, thereby facilitating the nut screwing operation, and in which the actuator for controlling the damping force can readily be mounted on the bracket in a single and simple operation.

To this end, the present invention provides a hydraulic buffer of the type in which the damping force can be controlled and which comprises: a piston rod projecting from a cylinder; a bracket attached to the projecting end of said piston rod and having at least two claws which are bent inwardly to face each other; a retainer provided with at least two fitting portions having flukes, said fitting portions being adapted to engage with respective of said claws of said bracket; an actuator attached to said retainer to control the damping force of the buffer; and spring means biasing said retainer to prevent said flukes from being disengaged from the corresponding claws of said bracket and supporting said retainer on said bracket.

By virtue of the above-described arrangement, it is possible to simplify and facilitate the nut screwing operation and to allow an actuator for controlling the damping force to be readily mounted on the bracket through the retainer. Thus, the operational efficiency can be improved by a large margin. In addition, there is no fear of either of the fitting portions being undesirably disengaged from the corresponding claws of the bracket, and it is therefore possible to maintain the actuator in a rigidly secured state at all times.

The above and other objects, features and advantages of the present invention will become more apparent from the following description of preferred embodiments thereof, taken in conjunction with the accompanying drawings.

BRIEF DESCRIPTION OF THE DRAWINGS

A preferred embodiments of the present invention will be described in detail hereinafter with reference to the accompanying drawings, in which:

FIGS. 4 to 12 show in combination a second embodiment of the hydraulic buffer according to the present invention, in which:

FIG. 4 is a vertical sectional view of an essential portion of the hydraulic buffer;

FIG. 5 is a side view of a retainer and an actuator shown in FIG. 4;

FIG. 6 is a plan view of the retainer shown in FIG. 5;

FIG. 7 is a sectional view taken along the line VII—VII in FIG. 6;

FIG. 8 is a front view of a leaf spring shown in FIG. 4;

FIG. 9 is a bottom view of the leaf spring;

FIG. 10 is an enlarged perspective view of an essential part of the leaf spring shown in FIG. 9;

FIG. 11 is a sectional view similar to FIG. 7, which shows the leaf spring and a coil spring which are incorporated in the retainer; and FIG. 12 is a perspective view of a bracket shown in FIG. 4;

FIGS. 13 to 22 show in combination a third embodiment of the hydraulic buffer according to the present invention, in which:

FIG. 13 is a vertical sectional view of an essential portion of the hydraulic buffer;

FIG. 14 is a sectional view of a bracket shown in FIG. 13;

FIG. 15 is a perspective view of the bracket;

FIG. 16 is a plan view of a retainer shown in FIG. 13;

FIG. 17 is a side view of the retainer as viewed from the right-hand side thereof;

FIG. 18 is a sectional view taken along the line XVIII—XVIII in FIG. 16;

FIG. 19 is a sectional view taken along the line XIX—XIX in FIG. 18;

FIG. 20 is a perspective view of one leg portion with a fluke shown in FIG. 18;

FIG. 21 is a sectional view showing one leg portion with a fluke which is being inserted into a corresponding hole in the bracket so as to be engaged therewith; and FIG. 22 is a sectional view similar to FIG. 18, which shows the retainer secured to the bracket.

DESCRIPTION OF THE PREFERRED EMBODIMENTS

Figure 1:
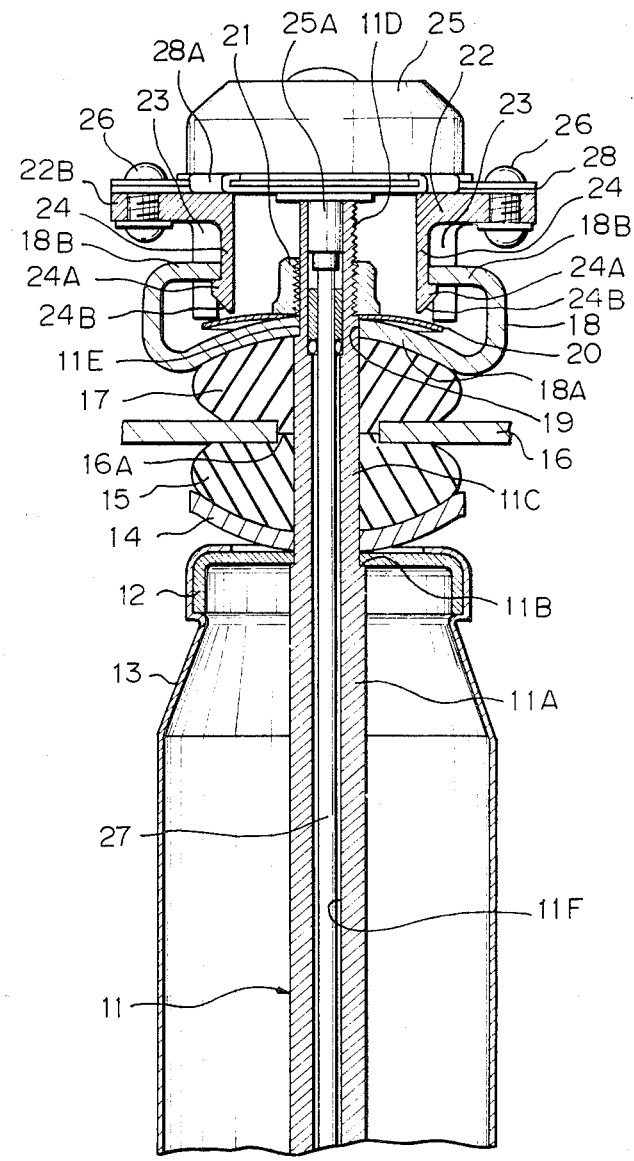
FIG. 1 is a longitudinal sectional view showing a first embodiment of the present invention.
Figure 2:
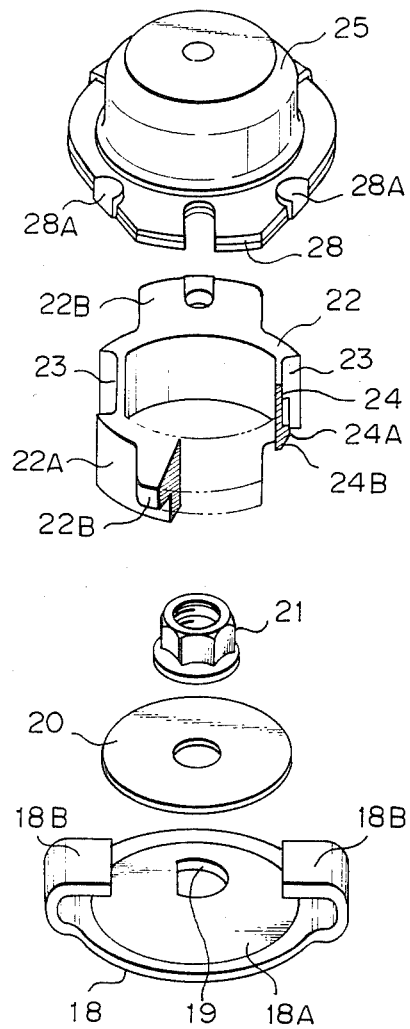
FIG. 2 is an exploded perspective view showing the disassembled state of a portion of the embodiment shown in FIG. 1.
Figure 3:
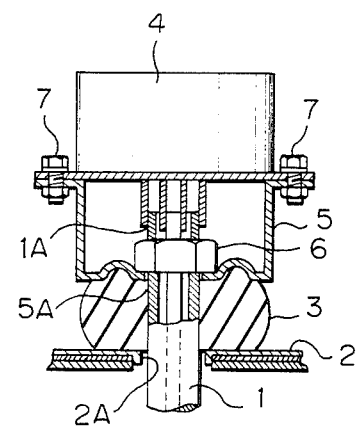
FIG. 3 is a longitudinal sectional view of the main portion of a prior art arrangement.

FIGS. 1 and 2 show in combination a first embodiment of the present invention.

In the drawings, reference numeral 11 denotes a piston rod one end of which projects from a cylinder (not shown) of a hydraulic buffer of an embodiment of the present invention, the projecting end 11A of the piston rod 11 being provided with a shoulder 11B, a portion 110 with a small diameter extending upwardly from the shoulder 11B, and an externally threaded portion 11D formed on the top end of the small diameter part 11C, and a fitting portion 11E which is bevelled on one side thereof and provided between the small diameter portion 11C and the externally threaded portion 11D for peripherally fixing the below described connecting member. Reference numeral 12 denotes a cap which is fitted on the small diameter portion 11C of the piston rod 11 by means of force fitting and on the shoulder 11B, an external casing 13 being bonded to the circumference of the cap 12 by means of welding for the purpose of the protection of the buffer cylinder and the piston rod 11. Reference numeral 14 denotes a washer fitted on the small diameter portion 11C in the same way as the cap 12, reference numeral 15 a cushion member which is fitted on the small diameter portion 11C and is disposed on the washer 14, and reference numeral 16 the body of a vehicle, which is provided with a hole 16A for inserting therein the projecting end 11A of the piston rod. Reference numeral 17 denotes a cushion member into which the small diameter portion 11C of the piston rod 11 projecting upwardly from the hole 16A of the above described body 16 is inserted and which is disposed on the body 16.

Reference numeral 18 denotes a bracket which is provided on the upper surface of the cushion member 17 and which comprises a holding portion 18A formed to have a concave shape for the purpose of holding the upper surface of the cushion member 17, and two opposite claws 18B which project upwardly from diametrically opposite edges of the holding portion 18A and which are curved into a U-shape, the top ends of the claws 18B being formed so as to extend radially inwardly above the upper portion of the holding portion 18A, to face each other at a given spacing, and to define therebetween spaces which are relatively wide with regard to the circumference of the holding portion 18A. An approximately D-shaped fitting hole 19 is provided in the center of the holding portion 18A, and the fitting portion 11E of the piston rod 11 is fitted into the fitting hole 19 and is fixed peripherally by the bracket 18.

Reference numeral 20 denotes a disc spring mounted on the holding portion 18A of the bracket 18, and reference numeral 21 denotes a nut which is screwed onto the externally threaded portion 11D of the piston rod 11 and is fastened onto the disc spring 20, the nut being fastened by a tool such as a wrench so that the cushion members 15, 17 are strongly pressed against the body 16 of the vehicle between the shoulder 11B of the piston rod 11 and the nut 21 via the washer 14 and the bracket 18, and the projecting end 11A of the piston rod 11 thus is fixed to the body 16.

Reference numeral 22 denotes a retainer forming a member connected to the top of the bracket 18 for holding a below-described actuator for controlling damping force, the retainer 22 having two flanges 22B which extend diametrically opposite to each other from the top of a cylindrical portion 22A, the cylindrical portion 22A being provided with two fitting grooves 23 which extend axially at right angles to the flanges 22B, the bottom of each groove 23 forming a fitting portion 24, the lower end of each fitting portion 24 being provided with a fluke 24A, the outer surface of which is provided with an inclined surface 24B which has a reverse or downwardly and inwardly taper.

For the purpose of connecting the retainer 22 to the bracket 18, each claw 18B of the bracket 18 is fitted in a corresponding fitting groove 23 of the retainer 22, and the retainer 22 is pushed downwardly on each claw 18B so that flukes 24A snap over ends of respective claws 18B. The inclined surfaces 24B of the claws 24A are guided over ends of the respective claws 18B. Thus, the retainer 22 is located in the axial and circumferential directions by the connecting member or bracket 18. In this state, the lower end of the cylindrical portion 22A of the retainer 22 presses against the disc spring 20 held between the nut 21 and the bracket 18, and curves the spring 20 downwardly, allowing the retainer 22 to be forced upwardly by the elastic force of the spring 20.

Reference numeral 25 denotes an actuator for controlling damping force fixed to the retainer 22 by screws 26 mounted on the retainer 22, an output shaft 25A of the actuator 25 being inserted into an axial insertion hole 11F of the piston rod 11 and detachably connected to the top end of a controlling rod 27 in the insertion hole 11F. Reference numeral 28 denotes a bottom plate fixed to the lower surface of the actuator 25 by claws 28A.

In the hydraulic buffer of the damping force control type constructed as described above, the output shaft 25A is rotated by the actuator 25 for controlling the damping force, and the damping force of the buffer is controlled by rotating a valve (not shown) by the controlling rod 27 connected to the output shaft 25A.

In the assembly of the buffer, when the nut 21 is screwed onto the externally threaded portion 11D of the piston rod 11, the nut 21 is rotated by engaging a tool such as a wrench and thus is tightened toward the top of the bracket 18 with the disc spring 20 therebetween. Since the claws 18B of the bracket 18 are formed so as to face each other diametrically with a relatively wide space therebetween, the nut 21 can be rotated by the tool such as a wrench through that space, and can be screwed onto the externally threaded portion 11D with comparative ease.

Furthermore, when the hydraulic buffer body is replaced, each claw 18B can be disengaged from the corresponding fluke 24A of the retainer 22 by pulling outwardly each claw 18B of the bracket 18 so that the claws are separated from each other, and the retainer 22 and the actuator 25 can be easily removed as a unit. The nut 21 then can be easily removed through the space between the claws 18B of the bracket 18, in the same way as during assembly. After the hydraulic buffer body is replaced, for the purpose of mounting the retainer 22 and the actuator 25 on the bracket 18, they are pushed downwardly so that each claw 18B of the bracket 18 is fitted into a corresponding groove 23 of the retainer 22, and consequently the inclined surface 24B of each fluke 24A is guided over a respective claw 18B and the flukes then snap over the claws and are connected thereto, resulting in the assembled state shown in FIG. 1.

In the above-described embodiment, the fitting grooves 23 are provided in the cylindrical portion 22A of the retainer 22, and the flukes 24A are provided at the lower ends of the fitting portions 24 of the fitting grooves 23. Alternatively, the cylindrical portion 22A may be provided with fitting grooves or fitting holes of a shape which corresponds to the top end of each claw 18B of the bracket 18, so that the retainer 22 can be located in the axial and rotational directions by fitting each claw 18B in the corresponding fitting groove or fitting hole. In this case, a guide surface for guiding each claw 18B in the fitting groove or fitting hole may be provided on the cylindrical portion 22A of the retainer 22, and the disc spring 20 may be omitted.

FIGS. 4 to 12 show in combination a second embodiment of the present invention.

In the drawings, the reference numeral 29 denotes a piston rod one end of which projects from a cylinder (not shown) of the hydraulic buffer according to the present invention, the projecting end 29A of the piston rod 29 being provided with a shoulder 29B, a portion 29C with a small diameter extending upwardly from the shoulder 29B, and an externally threaded portion 29D formed on the top end of the small diameter portion 29C, a fitting portion 29E which is bevelled on one side thereof being provided between the small diameter portion 29C and the externally threaded portion 29D for peripherally fixing a bracket 36 described below.

The reference numeral 30 denotes a cap which is fitted on the small diameter portion 29C of the piston rod 29 by means of, for example, press-fitting and is rigidly abutted against the shoulder 29B, an external casing 31 being rigidly secured to the circumference of the cap 30 by means of, for example, welding for the purpose of the protection of the buffer cylinder and the piston rod 29. The reference numeral 32 denotes a washer fitted on the small diameter portion 29C in the same way as the cap 30, the reference numeral 33 a cushion member which is fitted on the small diameter portion 29C and is disposed on the washer 32, and the reference numeral 34 the body of a vehicle, which is provided with a hole 34A for inserting therein the small diameter portion 29C. The reference numeral 35 denotes a cushion member into which the small diameter portion 29C of the piston rod 29 projecting upwardly from the hole 34A of the above-described body 34 is inserted and which is disposed on the body 34. Thus, the cushion members 33 and 35 cooperate with each other to clamp the body 34.

Figure 12:
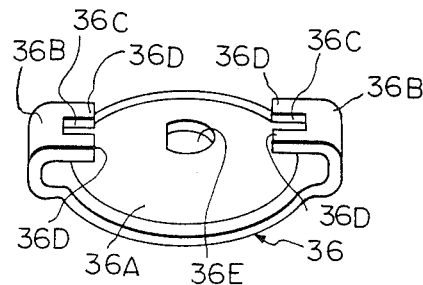
Figure 13:
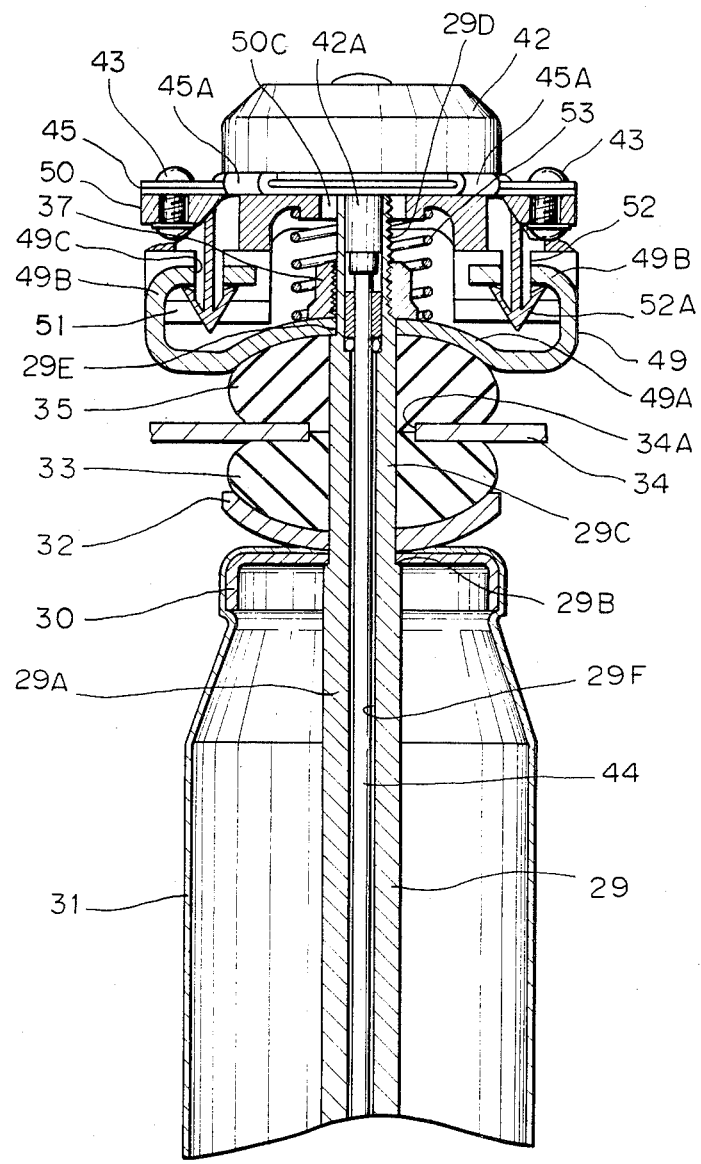
Figure 14:
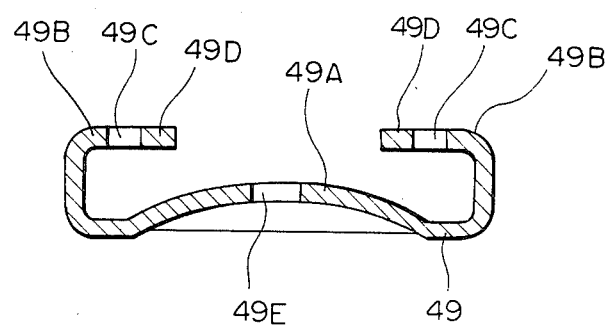
Figure 15:
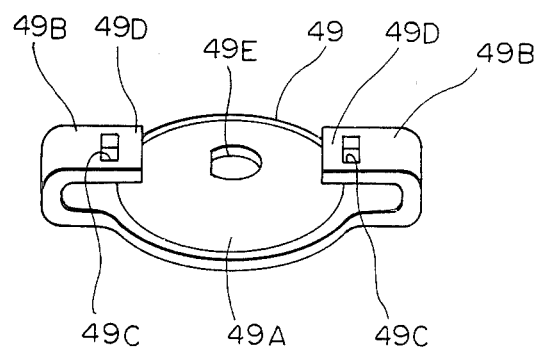
Figure 19:
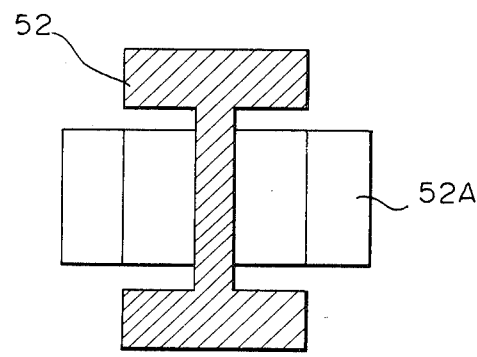
Figure 20:
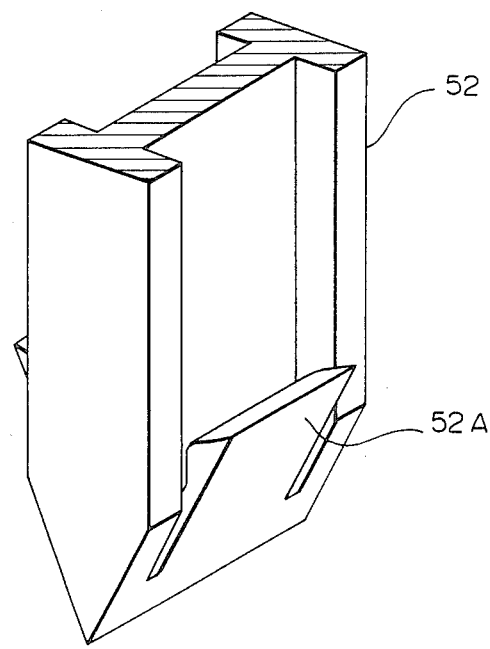

The reference numeral 36 denotes a bracket which is provided on the upper surface of the cushion member 35 so as to be fitted on the fitting portion 29E of the piston rod 29 and which comprises a holding portion 36A formemd to have a concave shape for the purpose of holding the upper surface of the cushion member 35, and a pair of opposite claws 36B which project upwardly from diametrically opposite edges of the holding portion 36A and which are curved into a U-shape, the top ends of the claws 36B being formed so as to extend radially inwardly above the upper portion of the holding portion 36A, to face each other at a given spacing, and to define therebetween tool insertion spaces which are relatively wide with regard to the circumference of the holding portion 36A as shown in FIG. 12. Notches 36C are diametrically provided in the centers of the respective distal ends of the claws 36B, so that outwardly projecting portions 39B of a retainer 38 (described below) are respectively disposed within the notches 36C. End portions of each claw 36B which define the notch 36C are adapted to serve as retaining portions 36D which retain respective flukes 39A of the retainer 38. An approximately D-shaped fitting hole 36E is provided in the center of the holding member 36A, and the fitting portion 29A of the piston rod 29 is fitted into the fitting hole 36E, thereby peripherally fixing the bracket 36.

The reference numeral 37 denotes a nut which is screwed onto the externally threaded portion 29D of the piston rod 29 and turned by a tool such as a wrench which is sidewardly inserted into the bracket 36 so that the nut 37 is fastened onto the holding member 36A of the bracket 36. Thus, when the nut 37 is tightened, the cushion members 33 and 35 are strongly pressed against the body 34 of the vehicle between the shoulder 29B of the piston rod 29 and the nut 37 through the washer 32 and the bracket 36, thereby clamping the body 34 between the cushion members 33 and 35, and thus fixing the projecting end 29A of the piston rod 29 to the body 34.

The retainer 38 is a member connected to the top of the bracket 36 for holding a below-described actuator 42 for controlling damping force, the retainer 38 comprising a cylindrical portion 38A with a bottom and two flanges 38B (see FIGS. 5 and 6) which extend diametrically opposite to each other from the top of the cylindrical portion 38A. A spring accommodating portion 38C is provided inside the cylindrical portion 38A, and an annular retainer groove 38D for retaining a leaf spring 40 (described below) is formed on the upper side of the spring accommodating portion 38C. A through-hole 38E for receiving an output shaft 42A (described below) is bored in a portion of the retainer 38 which is inwardly of the retainer groove 38D. In addition, the cylindrical portion 38A of the retainer 38 is provided with two fitting grooves 38F which extend axially at right angles to the flanges 38B, and two fitting portions 39 with flukes extend axially between respective of the fitting grooves 38F and the spring accommodating portion 38C.

Flukes 39A each in the shape of a substantially right-angled triangle project diametrically from both sides of the lower end of each fitting portion 39 in such a manner that the flukes 39A are respectively retained by the retainer portions 36D of the bracket 36. Outwardly projecting portion 39B is provided between the flukes 39A, the projecting portion 39B being bent into a substantially V-shape and projecting outwardly. The lower end portion of each outward projecting portion 39B is slanted at a predetermined angle to define an inclined surface 39C and extends through a corresponding notch 36C in the bracket 36.

For the purpose of connecting the retainer 38 to the bracket 36, each claw 36B of the bracket 36 is fitted in a corresponding fitting grove 38F of the retainer 38, and the retainer 38 is pushed downwardly onto claws 36B. Consequently, each leg or fitting portion 39 is guided at the inclined surface 39C on the lower side thereof, and while doing so, it is displaced by the corresponding claw 36B diametrically inwardly, whereby the flukes 39A of the leg portions 39 are allowed to be automatically retained by the corresponding retainer portions 36D of the claws 36B, thus enabling the retainer 38 to be positioned by virtue of the bracket 36 with respect to both axial and rotational directions. In this state, each outwardly projecting portion 39B is engaged with the notch 36C provided at the distal end of the corresponding claw 36B. Therefore, it is possible to readily remove the retainer 38 from the bracket 36 simply by pressing the outwardly projecting portions 39B downwardly, thus moving fitting portions 39 inwardly.

The leaf spring 40, serving as a stopper means, is disposed within the spring accommodating portion 38C defined in the retainer 38 and is adapted to bias the fitting portions 39 of the retainer 38 diametrically outwardly so that the fitting portions 39 are prevented from unintentionally disengaging from the corresponding claws 36B of the bracket 36. The leaf spring 40 is formed into a substantially U-shape and has a hole 40A bored in the center of the upper end thereof. A plurality (e.g., six) of projections 40B are provided along the edge of the hole 40A at equal angular intervals in such a manner that the projections 40B project diametrically inwardly and are acutely bent downwardly. Thus, the leaf spring 40 is retained in the retainer groove 38D by the projections 40B. Leg portions 40C are respectively provided on both sides of the leaf spring 40 in such a manner that the leg portions 40C extend in an outwardly and downwardly inclined manner so as to press the respective fitting portions 39 of the retainer 38 in order to prevent them from being displaced inwardly. The reference numeral 41 denotes a coil spring one end portion of which is engaged with the projections 40B of the leaf spring 40 and which is incorporated within the spring accommodating portion 38C in the retainer 38 together with the leaf spring 40B as one unit. The other end of coil spring 41 is adapted to press against the holding member 36A of the bracket 36 so as to bias the retainer 38 upwardly with respect to the bracket 36.

The actuator 42 for controlling damping force (hereinafter referred to simply as an "actuator") is mounted on the retainer 38 and fixed to the flanges 38B by rivets or screws 43. Output shaft 42A of the actuator 42 is passed through the through-hole 38E in the retainer 38 so as to project therefrom downwardly and is inserted into an axial insertion hole 29F of the piston rod 29, the output shaft 42A being detachably connected to the top end of a damping force controlling rod 44 in the insertion 29F. The reference numeral 45 denotes a bottom plate fixed to the lower surface of the actuator 42 by claws 45A.

In the hydraulic buffer of the damping force control type constructed as described above, the output shaft 42A is rotated by the actuator 42, and the damping force of the buffer is controlled by rotating a valve (not shown) provided inside the buffer cylinder by the controlling rod 44 connected to the output shaft 42A.

Figure 4:
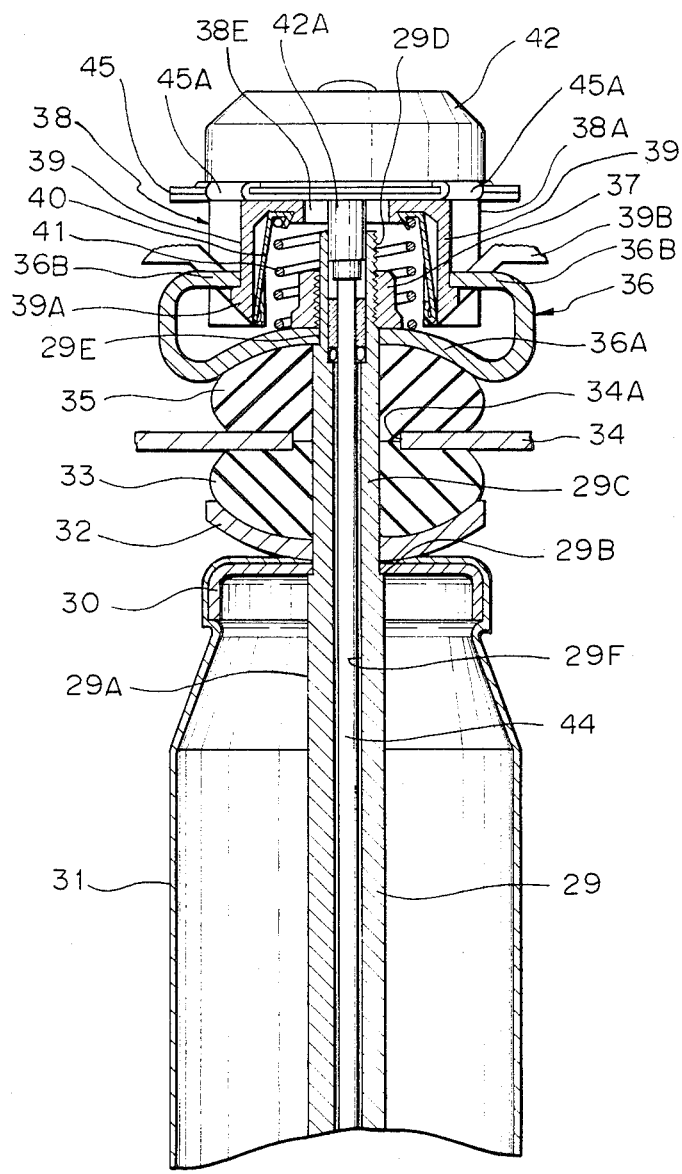
Figure 5:
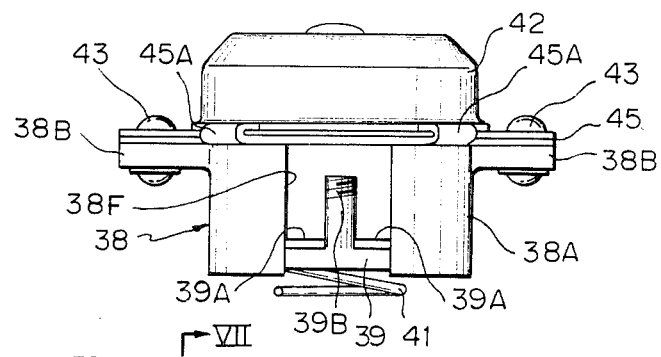
Figure 6:
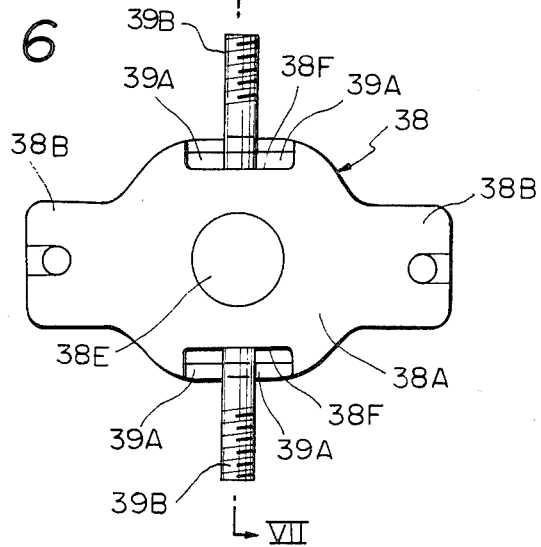
Figure 7:
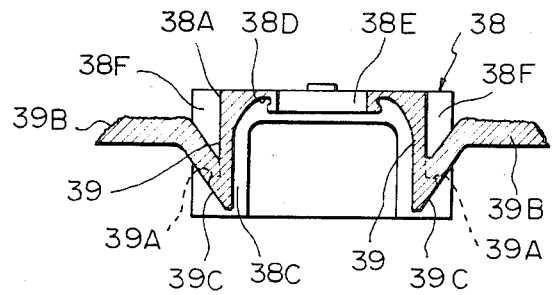
Figure 8:
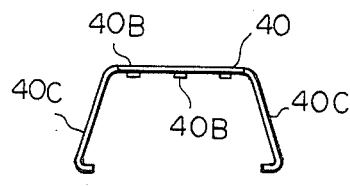
Figure 9:
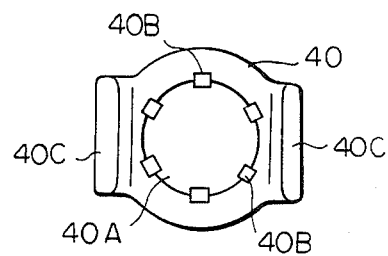
Figure 10:
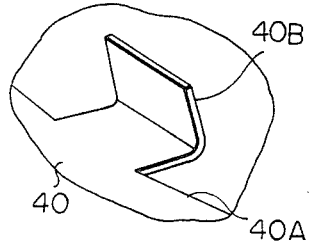
Figure 11:
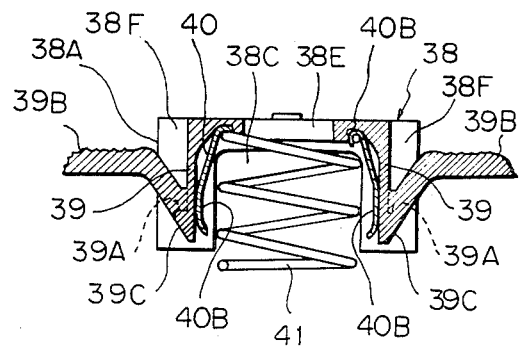

To mount the actuator 42 on the bracket 36 secured to the piston rod 29 in the assembly of the buffer, the actuator 42 is secured to the retainer 38 by the screws 43 or the like and the leaf spring 40 and the coil spring 41 are incorporated into the spring accommodating portion 38C of the retainer 38 in advance (see FIG. 5). Then, the fitting grooves 38F in the retainer 38 and the claws 36B of the bracket 36 are respectively aligned with each other, and the retainer 38, the actuator 42 and other associated members are pressed downwardly together as a unit. As a result, the flukes 39A of the fitting portions 39 are allowed to be automatically retained by the respective retaining portions 36D of the claws 36B, thereby allowing the actuator 42 to be readily mounted on the bracket 36 through the retainer 38 as shown in FIG. 4, and thus enabling the actuator 42 to be positioned with respect to both the axial and rotational directions in a single and simple operation. In this state, the fitting portions 39 of the retainer 38 are pressed outwardly by the corresponding leg portions 40C of the leaf spring 40. Therefore, even when an external force is sidewardly applied to the actuator 42 or other associated members, it is possible to inhibit the fitting portions 39 from being displaced diametrically inwardly. Thus, it is possible to reliably prevent the fitting portions 39 from accidentally disengaging from the corresponding claws 36B of the bracket 36.

When the actuator 42 is removed from the bracket 36 in order to replace the hydraulic buffer body, each fluke 39A can readily be disengaged from the corresponding retainer portion 36D simply by pressing downwardly each outwardly projecting portion 39B of the retainer 38 so that fitting portions 39 are moved inwardly against the force of leg portions 40C by virtue of relatively large bending moment which is applied to the retainer 38 by the pressing operation, and the actuator 42, together with the retainer 38, can readily be removed from the bracket 36. The nut 37 can also readily be removed through the space between the claws 36B of the bracket 36, in the same way as during assembly. More specifically, a tool such as a wrench is sidewardly inserted through the space, and the nut 37 is turned in the loosening direction. Thus, it is possible to readily replace the hydraulic buffer body.

It is therefore possible, according to this embodiment, to greatly simplify and facilitate the operation of screwing the nut 37 and the operation of mounting the actuator 42 on the bracket 36 and also reliably to prevent the actuator 42 from accidentally coming off the bracket 36 by virtue of the leaf spring 40. In addition, since one end portion of the coil spring 41 is engaged with the projections 40B of the leaf spring 40 and these projections 40B are retained by the retainer groove 38D of the retainer 38, it is possible to incorporate the leaf spring 40 and the coil spring 41 within the spring accommodating protion 38C in the retainer 38 as a single unit, so that it is possible to reliably prevent the coil spring 41 from falling from the spring accommodating portion 38C during assembly, or the operator from forgetting to incorporate the coil spring 41. Furthermore, when the hydraulic buffer body is to be replaced, the actuator 42 and the nut 37 can readily be removed, so that it is possible to improve the operational efficiency by a large margin.

FIGS. 13 to 22 show in combination a third embodiment of the present invention. It should be noted that, in this embodiment, the same constituent elements as those in the above-described second embodiment shown in FIGS. 4 and 5 are denoted by the same reference numerals, and description thereof is omitted.

In the drawings, the reference numeral 49 denotes a bracket which is disposed on the upper surface of the cushion member 35 and which is fitted on the fitting part 29E of the piston rod 29. This bracket 49 is formed in substantially the same way as the bracket 36 employed in the second embodiment and therefore comprises a holding portion 49A and two claws 49B. In the bracket 49, however, a hole 49C having a rectangular cross-section is bored in the distal end portion of each claw 49B, and a wall portion 49D which is located around each hole 49C defines a stopper means which prevents a corresponding fitting portion 52 with a fluke (described below) from being displaced diametrically inwardly or outwardly so as to disengage from each claw 49B. The bracket 49 is fitted onto the fitting part 29E of the piston rod 29 through a fitting hole 49E and fastened by the nut 37.

The reference numeral 50 denotes a retainer employed to mount the actuator 42 on the bracket 49. As shown in Fig. 16, the retainer 50 comprises a substantially rectangular retainer body 50A and two flanges 50B which extend perpendicularly to the longitudinal axis of the retainer body 50A. The actuator 42 is secured to the retainer 50 by screws 43 which are received through the flanges 50B. A through-hole 50C is bored in the center of the retainer body 50A for inserting the output shaft 42A of the actuator 42, and an annular retainer groove 50D for retaining a coil spring 53 (described below) is formed in the lower surface of the retainer 50 around the through-hole 50C. Two bifurcate guides 51 project downwardly from each side of the retainer body 50A, and slanted surfaces 51A for guiding against a corresponding claw 49B of the bracket 49 are respectively provided on the inner opposing surfaces of the guides 51.

Figure 21:
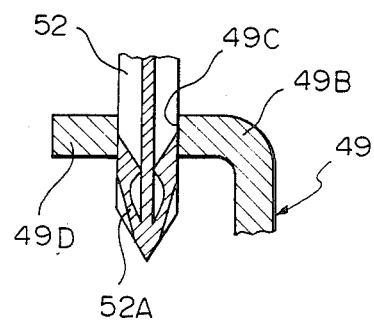
Figure 22:
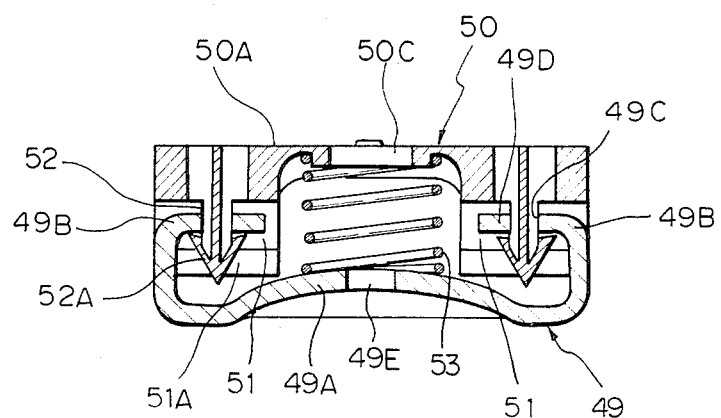

In addition, a fitting portion 52 with a fluke projects downwardly from a position intermediate between the opposing guides 51 on each side of the retainer body 50A. Each fitting portion 52 is formed such as to have a substantially I-shaped cross-section and is provided at the lower end thereof with a fluke 52A formed into a substantially V-shape so that the fluke 52A can be bent inwardly. Each fitting portion 52 is inserted into a corresponding hole 49C formed in the bracket 49 so as to be engaged therewith. When being inserted into the hole 49C, each fluke 52A is bent inwardly as shown in FIG. 21, and when having passed through the hole 49C, the fluke 52A snaps outwardly and is retained by the wall portion 49D located around the hole 49C as shown in FIG. 22.

The reference numeral 53 denotes a coil spring which is disposed between the retainer 50 and the bracket 49. One end portion of the coil spring 53 is retained by the retainer groove 50D provided in the retainer 50, so that the coil spring 53 is mounted on the bracket 49 together with the retainer 50. The other end portion of the coil spring 53 is pressed against the holding portion 49A of the bracket 49 in such a manner as to surround the nut 37, thereby biasing the retainer 50 upwardly, and thus maintaining each fluke 52A and the corresponding wall portion 49D in an engaged state.

It is also possible, according to this embodiment arranged as described above, to obtain advantages substantially siimlar to those offered by the first embodiment. This embodiment particularly provides the following advantages. With the actuator 42 secured to the upper surface of the retainer 50 by the screws 43 or the like, the retainer 50 is pressed downwardly in such a manner that each fitting portion 52 of the retainer 50 is passed through the corresponding hole 49C in the bracket 49. In consequence, the fluke 52A of the each leg portion 52 is first bent inwardly by the inner peripheral wall of the corresponding hole 49C as shown in FIG. 21 and then returned to its previous state as shown in FIG. 22. Thus, it is possible to allow each fluke 52A to be readily retained by the corresponding wall portion 49D of the bracket 49. In this assembly operation, the guides 51 which are respectively located on both sides of each fitting portion 52 serve to guide the corresponding claw 49B of the bracket 49 by the respective slanted surfaces 51A so as to allow each fitting portion 52 to be smoothly engaged with the corresponding hole 49C in the bracket 49.

When the fitting portions 52 have been engaged with the respective holes 49C, and each fluke 52A has been retained by the wall portion 49D located around the corresponding hole 49C, the coil spring 53 biases the retainer 50 upwardly so as to maintain each fluke 52A in its retained state. Accordingly, the retainer 50 and the actuator 42 can be accurately and reliably positioned with respect to the bracket 49. Even when an external force is applied to the retainer 50 or the actuator 42, it is possible to reliably prevent the retainer 50 from coming off the bracket 49 since each fitting portion 52 of the retainer 50 is engaged with the corresponding hole 49C in the bracket 49 and is inhibited by the wall portion 49D around the hole 49C from being displaced diametrically inwardly or outwardly.

As has been described above, according to the present invention, a bracket having two claws which are bent inwardly so as to face each other diametrically is fastened to the projecting end of a piston rod by means of a nut, while a fitting portion with a fluke of a retainer is engaged with each of the claws and prevented by a stopper means from being displaced diametrically inwardly so as to disengage from the corresponding claw. It is therefore possible to simplify and facilitate the nut screwing operation and to allow an actuator for controlling the damping force to be readily mounted on the bracket through the retainer. Thus, the operational efficiency can be improved by a large margin. In addition, there is no fear of each fitting portion being undesirably disengaged from the corresponding claw of the bracket, and it is therefore possible to maintain the actuator in a rigidly secured state at all times.

Although the present invention has been described through specific terms, it should be noted here that the described embodiments are not necessarily limitative, and various changes and modifications may be made thereto without departing from the scope of the invention which is limited solely by the appended claims.

What is claimed is:

1. A hydraulic buffer of the type in which the damping force can be controlled and which comprises:
    a piston rod projecting from a cylinder;
    a bracket attached to the projecting end of said piston rod and having at least two claws which are bent inwardly to face each other;
    a retainer provided with at least two fitting portions having flukes engaging with respective of said claws of said bracket;
    an actuator attached to said retainer to control the damping force of the buffer; and
    spring means for biasing said retainer axially of said piston rod to prevent said flukes from being disengaged from the corresponding claws of said bracket and for supporting said retainer on said bracket.

2. A hydraulic buffer according to claim 1, wherein said bracket is secured to said projecting end of said piston rod by means of a nut screwed onto said projecting end of said piston rod.

3. A hydraulic buffer according to claim 1, wherein said spring means is a disc spring disposed between said bracket and said retainer.

4. A hydraulic buffer according to claim 1, wherein said spring means is a coil spring disposed between said bracket and said retainer.

5. A hydraulic buffer according to claim 1, wherein said spring means comprises a coil spring disposed between said bracket and said retainer, and a leaf spring arranged in said retainer to bias said flukes diametrically outwardly.

6. A hydraulic buffer as claimed in claim 5, wherein said leaf spring is substantially U-shaped and includes opposite legs biasing respective said flukes outwardly.

7. A hydraulic buffer as claimed in claim 1, wherein said bracket is non-rotatably connected to said projecting end of said piston rod.

* * * * *